United States Patent [19]
Tanaka

[11] Patent Number: 5,894,409
[45] Date of Patent: Apr. 13, 1999

[54] SENSING ELEMENT LEAD WIRE CONNECTING STRUCTURE

[75] Inventor: Junko Tanaka, Shizuoka, Japan

[73] Assignee: Yazaki Corporation, Tokyo, Japan

[21] Appl. No.: 08/863,206

[22] Filed: May 27, 1997

[30] Foreign Application Priority Data

May 29, 1996 [JP] Japan .................. 8-135114

[51] Int. Cl.$^6$ .................. G01G 3/14; G01G 19/08
[52] U.S. Cl. .................. 361/749; 177/136; 177/210 R; 174/254
[58] Field of Search .................. 361/836, 749; 177/210 R, 210 EM, 211, 136, 137, 139; 336/188, 200, 221; 174/254

[56] References Cited

U.S. PATENT DOCUMENTS

| | | | |
|---|---|---|---|
| 3,593,217 | 7/1971 | Weber .................. | 336/221 |
| 4,332,174 | 6/1982 | Suzuki et al. .................. | 177/211 |
| 4,505,344 | 3/1985 | Hobbs et al. .................. | 177/210 EM |
| 4,677,538 | 6/1987 | Brodzik et al. .................. | 336/200 |
| 5,243,146 | 9/1993 | Nishitani .................. | 177/136 |
| 5,723,826 | 3/1998 | Kitagawa et al. .................. | 177/211 |

*Primary Examiner*—Leo P. Picard
*Assistant Examiner*—John B. Vigushin
*Attorney, Agent, or Firm*—Sughrue, Mion, Zinn, Macpeak & Seas, PLLC

[57] ABSTRACT

A sensing element lead wire connecting structure is provided for stably connecting conductors, forming the coil of a sensing element for load measurement, with the lead wires for external connection. In the sensing element lead wire connecting structure, a flexible circuit board is fixed to a base member receiving an applied load to be measured. Conductive patterns are formed on the circuit board and are electrically connected to the lead wires for externally outputting the load measurement.

9 Claims, 7 Drawing Sheets

SENSING ELEMENT LEAD WIRE CONNECTING STRUCTURE

BACKGROUND OF THE INVENTION

Field of the Invention

This invention relates to a structure for connecting a lead wire to a sensing element which is provided in a vehicle such as a truck or the like for measurement of a load carried thereon.

Background

The measurement of a load of a vehicle is performed mainly on a large-size vehicle such as a truck and, for example, for the purposes of preventing traffic accidents such as turnover due to overload, and for preventing deterioration of the vehicle and surfaces of the road from being stimulated.

Conventionally, the vehicle load measurement is carried out by placing a vehicle to be measured on a platform scale which is so called "KANKAN" in Japanese. However, since such conventional load measurement requires a facility which has a large-scale and wide installation space, the number of platform scales that can be installed is limited to thereby be unable to measure the loads of many vehicles, and further, the installation costs are high.

In order to avoid the above-mentioned inconveniences, in recent years, there has been supplied a load measuring device which can be carried on a vehicle itself for measurement of the load of the vehicle.

SUMMARY OF THE INVENTION

An object of the invention is to provide a sensing element lead wire connecting structure which is stably able to connect conductors, which respectively form a coil of a sensing element for measuring a load such as the loadage of a vehicle or the like, with lead wires for use in external connection.

To achieve the above object, a first aspect of the invention provides a sensing element lead wire connecting structure, for connecting lead wires for external connection to conductors, comprises a sensing element including a base member formed of magnetic material and the conductors forming a coil wound around the base member for externally outputting electric variations occurring on the coil in accordance with a load applied onto the base member, a printed circuit board to be mounted on the base member, a conductive pattern formed in the portion of the printed circuit board that is exposed externally while the printed circuit board is mounted on the base member, and, a fixing device for fixing the printed circuit board to the base member in such a manner that it is mounted on said base member, in which electrical connection between the conductors and the lead wires corresponding to the conductors is made on the conductive pattern.

Further, in the sensing element lead wire connecting structure according to a second aspect of the invention, the fixing device includes an engaging hole formed in the printed circuit board and a fixing pin which, with the printed circuit board mounted on the base member, can be inserted into the engaging hole and can be thereby fixed to the portion of the base member that corresponds to the engaging hole.

Further, in the sensing element lead wire connecting structure according to a third aspect of the invention, the fixing device includes an engaging hole formed in the printed circuit board and an engaging pin provided on and projected from the base member portion corresponding to the engaging hole, and also wherein, with the printed circuit board mounted on said base member, if the engaging hole is engaged with the engaging pin, then the printed circuit board can be fixed to the base member.

Further, in the sensing element lead wire connecting structure according to a fourth aspect of the invention, the conductive pattern is formed in one surface of the printed circuit board and the fixing device includes an adhesive material for gluing the other surface of the printed circuit board opposed to one surface thereof to the base member.

Further, in the sensing element lead wire connecting structure according to a fifth aspect of the invention, the coil is formed of two of the above-mentioned conductors respectively wound around the base member in such a manner that they intersect each other, the lead wires are respectively connected to these two conductors, two end portions of the printed circuit board are respectively mounted on the mutually opposed front and back surfaces of the base member, the fixing device has two fixing parts which are provided correspondingly in the printed circuit board to be mounted on the front surface of the base member and in the printed circuit board to be mounted on the back surface of the base member, the above-mentioned conductive pattern has two conductive patterns which are respectively formed in the printed circuit board to be mounted on the front surface of the base member and in the printed circuit board to be mounted on the back surface of the base member, one of the two conductors is electrically connected to the corresponding one of the lead wires on the conductive pattern of the printed circuit board to be mounted on the front surface of the base member, and electrical connection between the other of the two conductors and the corresponding one of the lead wires is made on the conductive pattern of the printed circuit board to be mounted on the back surface of the base member.

Further, in the sensing element lead wire connecting structure according to a sixth aspect of the invention, the fixing device corresponding to the printed circuit board to be mounted on the front surface of the base member is formed of a member common to the fixing device corresponding to the printed circuit board to be mounted on the back surface of the base member.

Further, in the sensing element lead wire connecting structure according to a seventh aspect of the invention, the printed circuit board to be mounted on the front surface of the base member and the printed circuit board to be mounted on the back surface of the base member are formed of a single flexible circuit board, when the flexible circuit board is folded up into two portions which are opposed to each other with the folded position of the flexible circuit board between them, one of the two folded flexible circuit board portions is mounted on the front surface of the base member, and the other flexible circuit board portion is mounted on the back surface of the base member.

Further, in the sensing element lead wire connecting structure according to an eighth aspect of the invention, the fixing device includes a through pin which, with the two flexible circuit board portions respectively mounted on the front and back surfaces of the base member, can be inserted from outside into one of the two flexible circuit board portions, is allowed to extend through the base member and the other of the two flexible circuit board portions, and can be then projected out in the leading end portion thereof externally of the other flexible circuit board portion, the through pin includes in the base end portion thereof a head portion which can be engaged with one flexible circuit board portion from outside, and the portion of the through pin that extends through and is projected out externally from the other flexible circuit board portion is formed to have such a dimension that, with the head portion engaged with said one flexible circuit board portion, prevents the other flexible circuit board portion from being taken out from the leading end portion of the through pin.

Further, in the sensing element lead wire connecting structure according to a ninth aspect of the invention, the conductive pattern includes a first land to which the conductors can be electrically connected, and a second land which is electrically connected to the first land and to which the lead wires can be electrically connected.

According to the first aspect of the invention, since the electrical connection between the conductors respectively forming the coil of the sensing element and the lead wires for external connection is made on the conductive pattern of the printed circuit board which is mounted on the base member and is then fixed thereto by the fixing device, a connecting operation to electrically connect the conductors and lead wires to the conductor pattern by soldering or the like can be carried out on the printed circuit board that is fixed to the base member. Due to this, an operation to connect the conductors forming the coil of the sensing element for load measurement to the lead wires for external connection can be executed in a stable manner, which makes it possible to surely prevent the occurrences of poor soldering, breakage of the conductors during operation and the like.

Also, according to the second aspect of the invention, because the fixation of the printed circuit board to the base member is achieved by fixing the fixing pin to the base member through the engaging hole formed in the printed circuit board, the fixation of the printed circuit board to the base member by use of the fixing device can be accomplished by a simple operation.

Further, according to the third aspect of the invention similarly to the second aspect of the invention, the fixation of the printed circuit board to the base member can be attained by engagement of the engaging pin of the base member into the engaging hole of the printed circuit board, the fixation of the printed circuit board to the base member by use of the fixing device can be achieved by a simple operation.

Further, according to the fourth aspect of the invention similarly to the second aspect and the third aspect of the invention, since the fixation of the printed circuit board to the base member can be attained by gluing the other surface of the printed circuit board, which is opposed to one surface of the printed circuit board where the conductive pattern is formed, to the base member by an adhesive material, the fixation of the printed circuit board to the base member by use of the fixing device can be achieved by a simple operation.

And, according to the fifth aspect of the invention, the electrical connection between the two conductors forming the coil of the sensing element and the lead wires corresponding to the two conductors is made by the respective conductive patterns of the individual printed circuit boards which are respectively mounted on the front and back surfaces of the base member. Due to this, the two conductors can be separately guided to the front and back surfaces of the base member without confusing them with each other and thus they can be electrically connected to their corresponding lead wires with no mistake.

Also, according to the sixth aspect of the invention as the fifth aspect of the invention, when the individual printed circuit boards are respectively mounted on the front and back surfaces of the base member, the fixing device for fixing the individual printed circuit boards to the front and back surfaces of the base member is structured as a common member. This can reduce the number of parts and the number of steps of an operation to fix the individual printed circuit boards to their corresponding front and back surfaces of the base member by the fixing device.

Further, according to the seventh aspect of the invention as the fifth aspect and sixth aspect of the invention, when the individual printed circuit boards are respectively mounted on the front and back surfaces of the base member, these printed circuit boards are formed of a single flexible circuit board. Due to this, the printed circuit boards to be respectively mounted onto the front and back surfaces of the base member can be produced as a single part, which makes it possible to reduce the number of parts required.

Still further, according to the eighth aspect of the invention as the seventh aspect of the invention, when the individual printed circuit boards respectively to be mounted on the front and back surfaces of the base member are formed of a single flexible circuit board and, with the flexible circuit board folded up to two portions, the two flexible circuit board portions opposed to each other with the folded position between them are respectively mounted onto the corresponding front and back surfaces of the base member, if, with one flexible circuit board portion engaged by the head portion of the through pin from outside, the portion of the through pin extending through and projecting out externally of the other flexible circuit board portion is so structured as to have such dimension that prevents the other flexible circuit board portion from being taken out from the present through pin portion, then the flexible circuit board mounted on the front and back surfaces of the base member can be positively fixed to the base member by a simple operation to insert the through pin through one flexible circuit board portion from outside and allow it to extend through the base member and the other flexible circuit board portion, using only a single part, that is, the through pin.

Moreover, according to the ninth aspect of the invention, the electrically connected portions of the conductors and lead wires to the conductive pattern are separated to the first land on the conductive pattern and the second land connected electrically to the first land. Due to this, if the electrically connected portions of the conductors and lead wires with respect to the conductive patterns are produced by soldering or the like, when compared with a case where the conductors and lead wires are electrically connected to the same portion on the conductive pattern, there is eliminated a time and labor consuming operation to hold the electrically connecting portions of both the conductors and lead wires in an superimposing manner, and further, it is possible to enhance further the stability of a connecting operation to connect the conductors to the lead wires for external connection.

DETAILED DESCRIPTION OF THE PREFERRED EMBODIMENTS

First, a first and a second preliminary embodiments for the invention will now be illustrated with reference to FIGS. 8 to 12.

Figure 8:
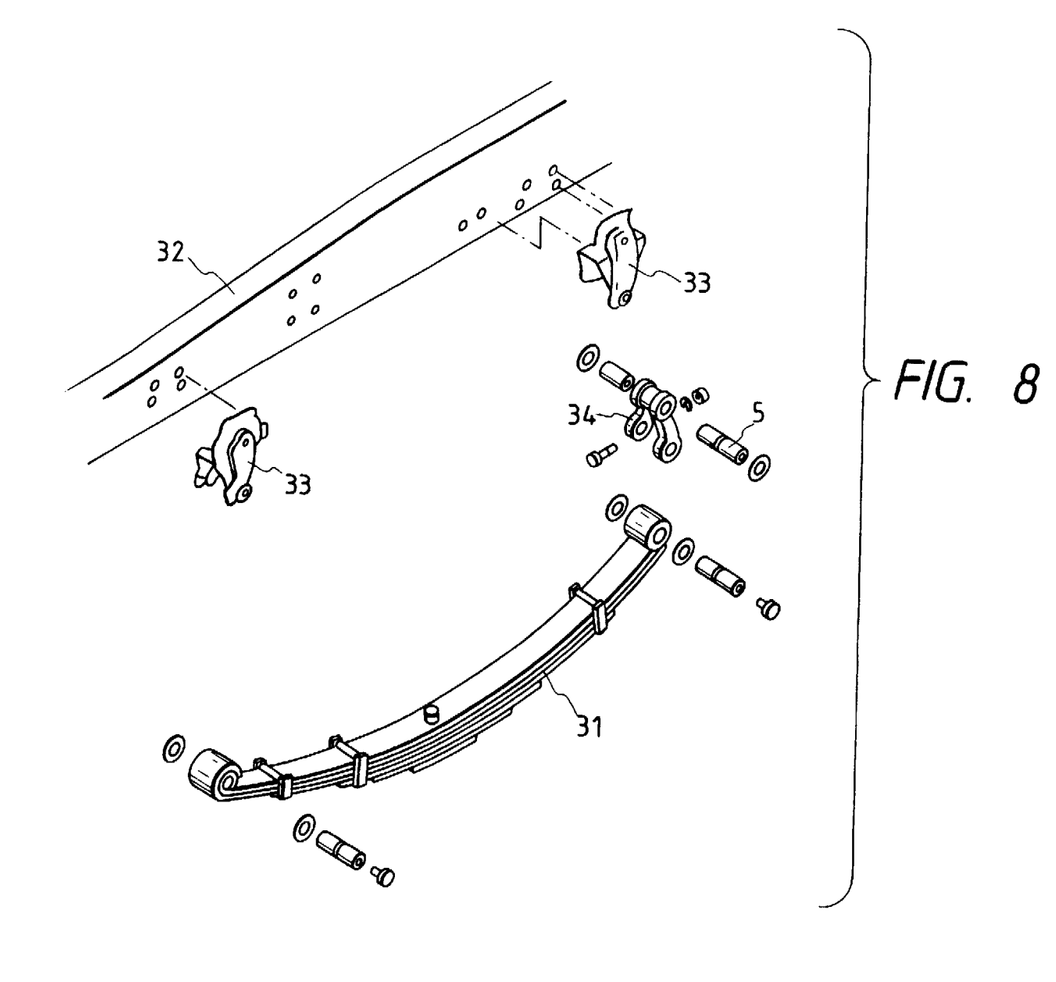
FIG. 8 is an exploded perspective view of a large-size vehicle such as a truck or the like, showing the portion of the vehicle in which a sensing element for load measurement incorporating the invention therein is disposed.

As shown in FIG. 8, a shackle 34 is interposed between the other end portion of a leaf spring 31 to be connected to the frame of a load carrying platform 32 through a bracket 33 having one forked end portion and another bracket 33 connected to the load carrying platform 32. That is, a sensing element for load measurement such as a gauge sensor of a strain type or the like is installed within a shackle pin 5 used to connect the present shackle 34 to the bracket 33 in an oscillatable manner. In more particular, two sensing elements are provided, and the load of the vehicle is calculated in accordance with the sum of the measured values of the two sensing elements.

First Preliminary Embodiment

Figure 9:
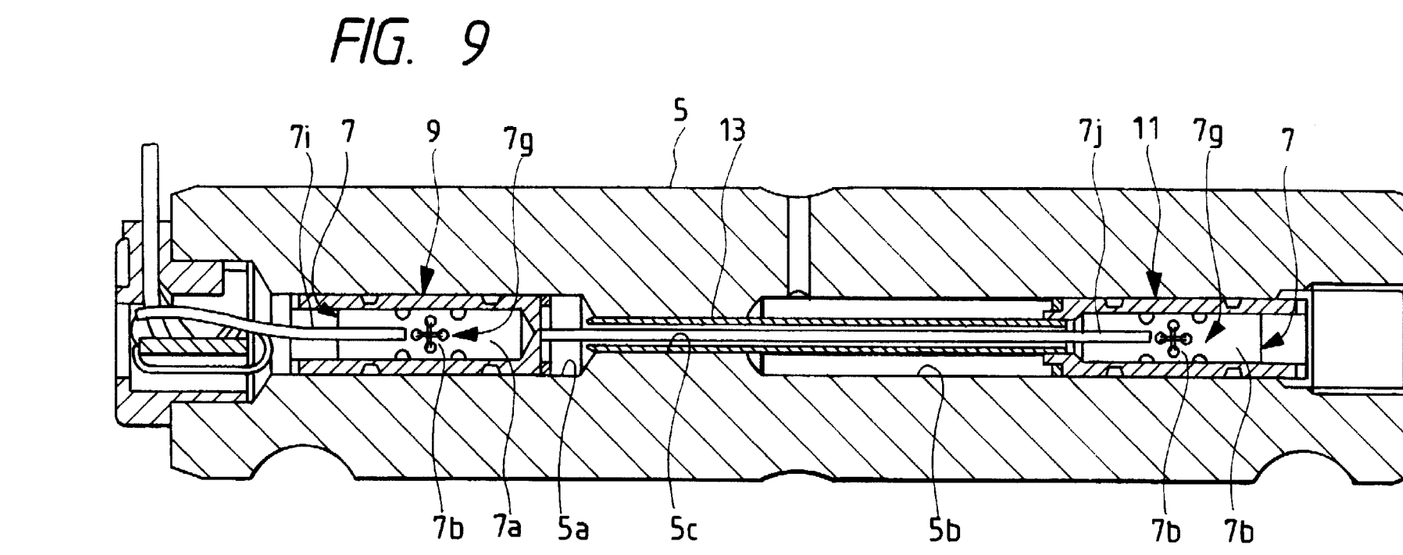
FIG. 9 is a section view of a shackle pin shown in FIG. 8, illustrating how the sensing element is disposed within the shackle pin.

FIG. 9 is a section view of the shackle pin 5, which shows the position of the sensing element within the shackle pin 5. In FIG. 9, the shackle pin 5 includes two storage portions 5a and 5b respectively formed in the two end portions thereof in the axial direction thereof, while the two storage portions 5a and 5b are in communication with each other within the shackle pin 5 through a through hole 5c.

Figure 10:
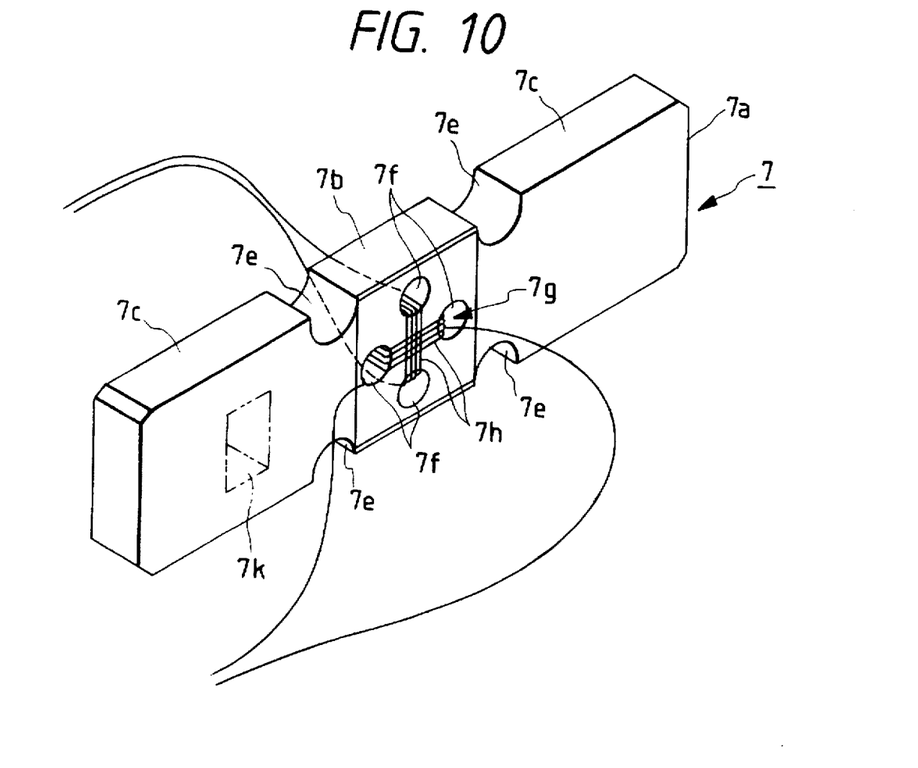
FIG. 10 is a perspective view of the sensing element shown in FIG. 9.

As shown by a perspective view in FIG. 10, each of the sensing elements 7 includes a plate-shaped member 7a and a coil 7g serving as a sensing portion.

The plate-shaped member 7a is formed of magnetic material such as permalloy or the like in a flat shape having a substantially rectangular plane. Also, the plate-shaped member 7a has a coil portion 7b disposed substantially in the central portion of the plate-shaped member 7a when viewed in the longitudinal direction thereof, and two fixing portions 7c and 7c respectively disposed on the both sides of the coil portion 7b.

Four notch portions 7e are formed respectively on the two edge portions of the plate-shaped member 7a, in the width direction perpendicular to the above-mentioned longitudinal direction, at two boundary portions between the coil portion 7b and the two fixing portions 7c and 7c. The notch portions 7e each has a substantially semi-circular-shape, and are formed to relieve stresses applied onto the plate-shaped member 7a. Also, in the coil portion 7b that is defined inside the four notch portions 7e, there are formed four through holes 7f which respectively extend through the coil portion 7b and are spaced from each other in the above-mentioned longitudinal and width directions.

The coil 7g includes two magnet wires 7h which form a cross coil, while the two magnet wires 7h are covered with insulation material (not shown) such as enamel or the like.

One of the two magnet wires 7h is wound around the two through holes 7f and 7f opposed to each other in the above-mentioned longitudinal direction, while the two ends of the present magnet wire 7h are respectively drawn out from their associated through holes 7f and 7f. On the other hand, the other magnet wire 7h is wound around the two remaining through holes 7f and 7f opposed to each other in the above-mentioned width direction, while the two ends of the present magnet wire 7h are respectively drawn out from their associated through holes 7f and 7f.

One of the thus structured sensing elements 7, as shown in FIG. 9, is stored in a first case 9 and is then stored together with the first case 9 into one storage portion 5a of the shackle pin 5, whereas the other sensing element 7 is stored in a second case 11 and is then-stored together with the second case 11 into the other storage portion 5a of the shackle pin 5.

The four end portions of the two magnet wires 7h of the sensing element 7 inserted into the other storage portion 5b together with the second case 11 are covered by twos with insulation material 7j such as vinyl or the like, are passed through a wire connecting pipe 13 inserted into the through hole 5c from the second case 11, and are guided to one storage portion 5a.

The four end portions of the two magnet wires 7h of the sensing element 7 inserted into one storage portion 5b together with the second case 9 are covered by twos with the insulation material 7j, and are drawn out externally of the shackle pin 5 from the storage portion 5a together with the four end portions of the magnet wires 7h guided from the other storage portion 5b.

However, although the magnet wires 7h of the respective sensing elements 7 are covered with the insulation materials, the magnet wires 7h are themselves small in the core diameters thereof and are thus not proper in rigidity and durability.

Second Preliminary Embodiment

To improve the rigidity and durability, a sensing element structured such that the magnet wires 7h thereof are switched in connection to a multi-core lead wire on the way, is proposed.

Figure 11:
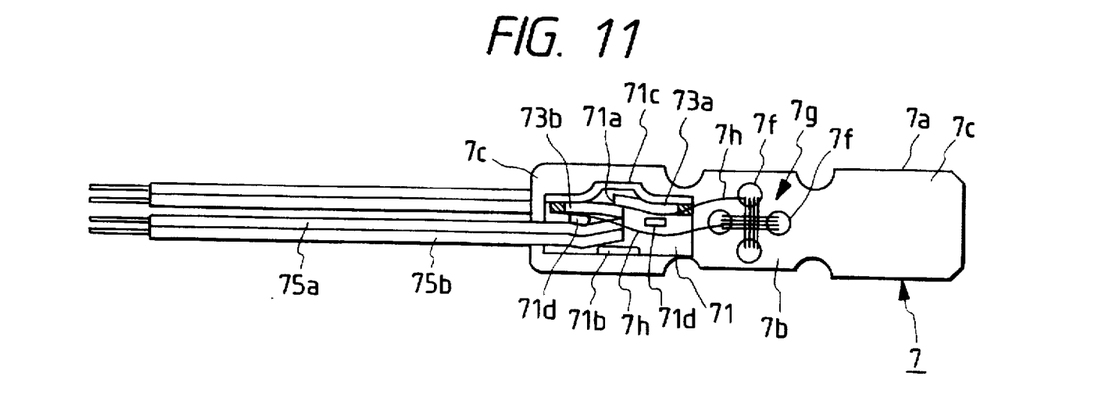
FIG. 11 is a front view of a structure of a sensing element.

FIG. 11 is a front view of the structure of the sensing element. In the sensing element 7, on two insulation seats 71 and 71 (in FIG. 11, there is shown only the insulation seat that is disposed on the front surface side) which can be mounted onto one fixing portion 7c of a plate-shaped member 7a from the two side surfaces thereof, magnet wires 7h which are extended by twos from the respective sensing elements 7 are switched in connection to multi-core lead wires 73a, 73b, 75a, and 75b for external connection.

Each of the above-mentioned insulation seats 71 is engaged with and mounted into a securing hole 7k which, as shown by an imaginary line in FIG. 10, is formed in one fixing portion 7c of the plate-shaped member 7a and has a rectangular shape long in the longitudinal direction thereof, but which is not provided in the sensing element 7 proposed in the first preliminary embodiment. The insulation seat 71 is formed of insulation material such as hard plastics or the like.

Figure 12:
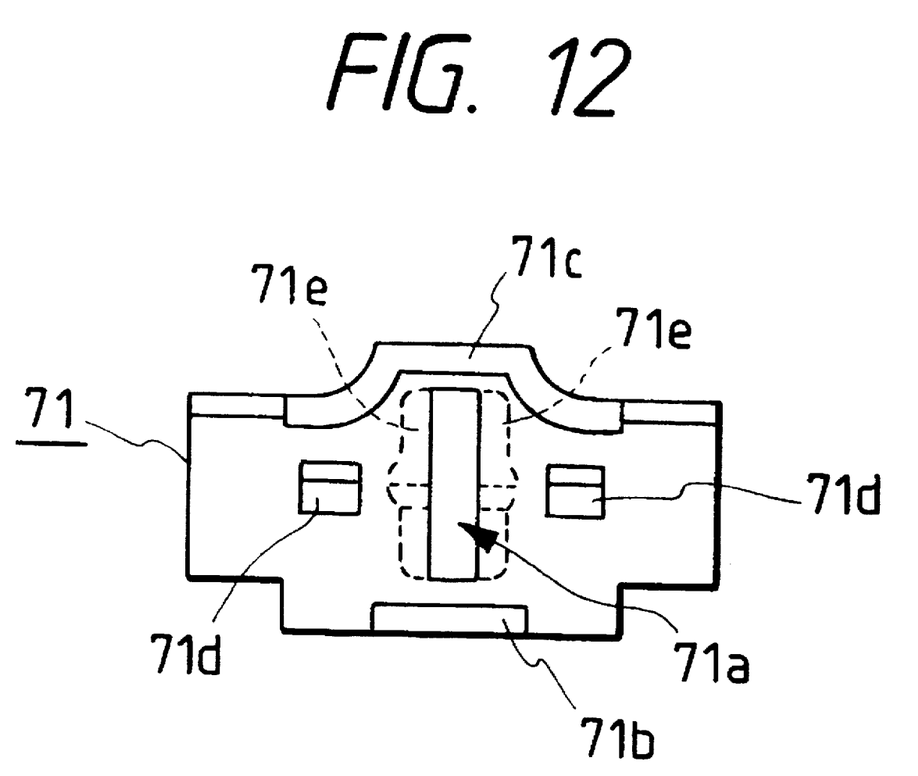
FIG. 12 is an enlarged front view of an insulation seat shown in FIG. 11.

Also, the insulation seat 71, as can be seen from the enlarged front view thereof shown in FIG. 12, includes a lead insertion hole 71a which is formed substantially in the central portion thereof and extends over the two front and back surfaces thereof, a first flange portion 71b projectingly provided on the lower edge of the front surface, a second flange portion 71c projectingly provided on the upper edge of the front surface and broadening toward the two ends thereof in the lower edge direction, two securing pieces 71d and 71d respectively provided on the front surface of the insulation seat 71 and projected from the two positions thereof oppositely spaced from the lead insertion hole 71a, and a pair of press insertion pieces 71e and 71e respectively provided on the black surface of the insulation seat 71 and projected from the two side edges of the lead insertion hole 71a.

Each of the securing pieces 71d and 71d is formed in a hook shape in which the leading end portion thereof is bent in the second flange portion 71c direction. Also, the press insertion pieces 71e and 71e are respectively projected in a dimension which is substantially half the plate-shaped member 7a and, by inserting the pair of press insertion pieces 71e and 71e into the securing hole 7k, the press insertion pieces 71e and 71e can be press inserted in such a manner that the outer surfaces of the respective press insertion pieces 71e and 71e are press contacted with the mutually opposing long sides of the inner peripheral surface of the securing hole 7k.

The insulation seats 71 each having the above-mentioned structure can be mounted onto the front and back surfaces of the fixing portion 7c by press inserting the press insertion pieces 71e and 71e of the respective insulation seats 71 into the securing hole 7k of one fixing portion 7c of the plate-shaped member 7a from the two front and back sides thereof, while the lead insertion holes 71a of the two insulation seats 71 are allowed to communicate with each other through the securing hole 7k.

And, the connection switching of the magnet wires of the sensing elements 7 using the two insulation seats 71 to the lead wires 73a, 73b, 75a and 75b is executed in the following manner.

At first, the leading portions of the lead wires 73a and 73b are inserted from the front surface side of the plate-shaped member 7a through the lead insertion holes 71a of the two insulation seats 71 and are extended out to the back surface side of the plate-shaped member 7a, so that the two leads 73a and 73b are held between the first flange portion '71c of the front surface side insulation seat 71 and one securing piece 71d. At the same time, the leading end of the lead wire 73a extended out to the back surface side is caught by one securing piece 71d of the back surface side insulation seat 71 and is thereby held between this securing piece 71d and the second flange portion 71c, while the leading end of the other lead wire 73b is caught by the other securing piece 71d of the back surface side insulation seat 71 and is thereby held between this securing piece 71d and the second flange portion 71c.

Similarly to the above, the leading portions of the lead wires 73a and 73b are inserted from the back surface side of the plate-shaped member 7a through the lead insertion holes 71a of the two insulation seats 71 and are extended out to the front surface side of the plate-shaped member 7a, so that the two lead wires 73a and 73b are held between the first flange portion 71c of the back surface side insulation seat 71 and one securing piece 71d. At the same time, the leading end of the lead wire 73a extended out to the front surface side is caught by one securing piece 71d of the front surface side insulation seat 71 and is thereby held between this securing piece 71d and the second flange portion 71c, while the leading end of the other lead wire 73b is caught by the other securing piece 71d of the front surface side insulation seat 71 and is thereby held between this securing piece 71d and the second flange portion 71c.

On completion of mounting of the respective lead wires 73a, 73b, 75a and 75b onto the insulation seats 71, the covers of the respective lead wires 73a, 73b, 75a and 75b are peeled off and the insulation material 7j is also peeled off to thereby expose the four magnet wires 7h of the sensing elements 7, and the insulation covers of the respective magnet wires 7h such as enamel or the like are peeled off, so that the core wires thereof can be soldered to each other.

However, in the above-mentioned connection change of the magnet wires 7h of the insulation seats 71 to the lead wires 73a, 73b, 75a and 75b, the leading ends of the magnet wires 7h are moved to the leading ends of the lead wires 73a, 73b, 75a and 75b which are situated nearer to the two sides of the insulation seats 71 in the longitudinal direction thereof than those of the insulation seats 71 held by and between the securing piece 71d and first and second flange portions 71b and 71c and are thereby floated above the insulation seats 71. For this reason, if the magnet wires 7h or a soldering iron are applied to the lead wires 73a, 73b, 75a and 75b in soldering, then the lead wires 73a, 73b, 75a and 75b are moved in a direction to part away from or approach the insulation seats 71 or in other directions, which makes it difficult to solder the magnet wires 7h to the lead wires 73a, 73b, 75a and 75b in such a manner that the former can be electrically connected to the latter in a reliable manner.

In other words, since the magnet wires 7h and the lead wires 73a, 73b, 75a and 75b are originally fine and small wire members, in the state where the lead wires 73a, 73b, 75a and 75b are floated above the insulation seats 71, it is almost impossible that the leading ends of such fine and small wire members can be fixed at constant positions due to their own rigidity when applying the soldering iron to them. Therefore, in the above-mentioned way of connection change, there is some room for improvement in order to be able to surely prevent the occurrences of poor soldering, breakage of the magnet wires 7h during operation, and the like.

First Embodiment

Next, a first embodiment of a sensing element lead wire connecting structure according to the invention will now be illustrated with reference to FIGS. 1 to 4. In FIGS. 1 to 4, the same members and positions as those shown in FIGS. 10 and 11 are respectively described while they are given the same designations as those in FIGS. 10 and 11.

Figure 1:
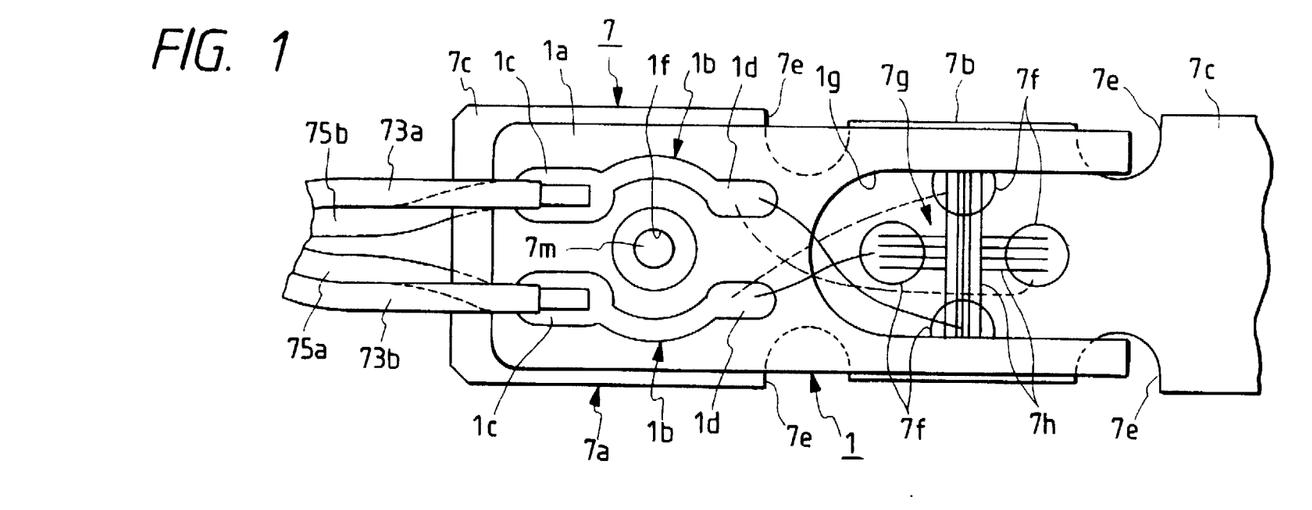
FIG. 1 is an enlarged front view of the main portions of a first embodiment of a sensing element lead wire connecting structure according to the invention.
Figure 2:
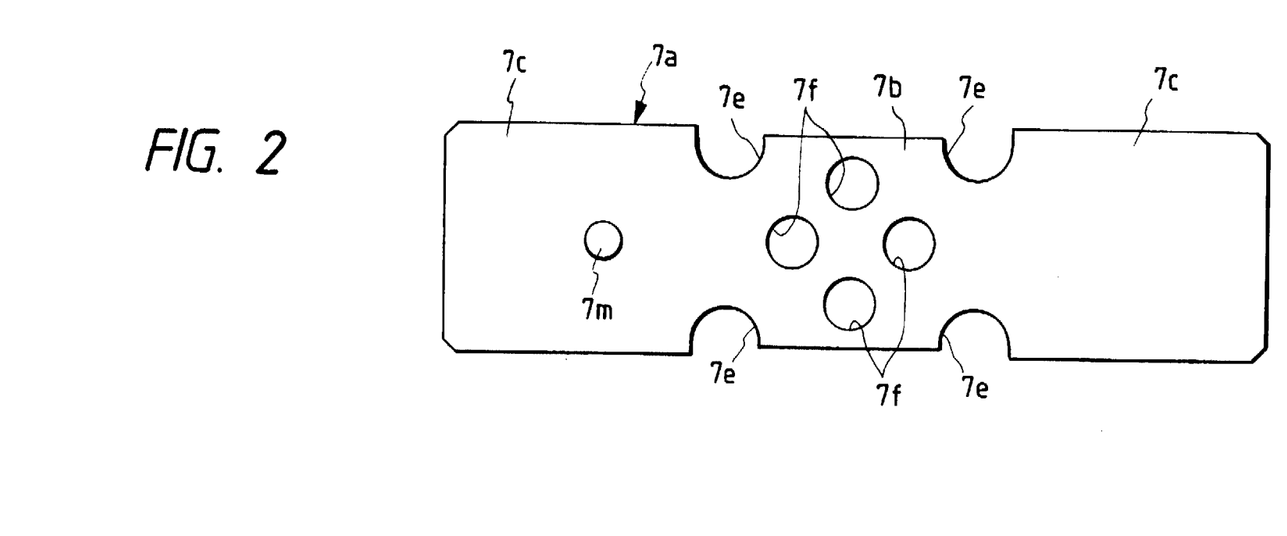
FIG. 2 is an enlarged plan view of a plate-shaped member of a sensing element shown in FIG. 1.

In FIG. 1, reference character 7 designates a sensing element according to the present embodiment and, as shown in FIG. 2, the sensing element 7 includes a plate-shaped member 7a and a coil 7g.

The above-mentioned plate-shaped member 7a (which corresponds to a circuit board), similarly to the sensing element shown in FIG. 10, is formed of magnetic material such as permalloy or the like in a flat shape having a substantially rectangular plan view. And, the plate-shaped member 7a includes a coil portion 7b, which is formed substantially in the central portion in the longitudinal direction thereof and is defined by four notch portions 7e formed by twos in the two edge portions of the plate-shaped member 7a in the width direction thereof extending at right angles to the longitudinal direction thereof, and two fixing portions 7c, 7c respectively disposed on the two sides of the coil portion 7b. The coil portion 7b includes four through holes 7f which are respectively formed in the longitudinal and width directions of the plate-shaped member 7a at intervals from each other in such a manner that they extend through the coil portion 7b.

The above-mentioned coil 7g, similarly to the sensing element 7 shown in FIG. 10, as shown in FIG. 1, includes two magnet wires 7h (which correspond to conductors) cooperating in forming a cross coil, while these magnet wires 7h are respectively coated or covered with insulation material (not shown) such as enamel or the like.

One of the two magnet-wires 7h is wound around the two through holes 7f and 7f which are mutually opposed to each other in the above-mentioned longitudinal direction, and the two ends of the magnet wire 7h are drawn out from their associated through holes 7f and 7f, respectively. The other magnet wire 7h is wound around the remaining two through holes 7f and 7f which are mutually opposed to each other in the above-mentioned width direction, while the two ends thereof are respectively drawn out from their associated through holes 7f and 7f.

Figure 3:
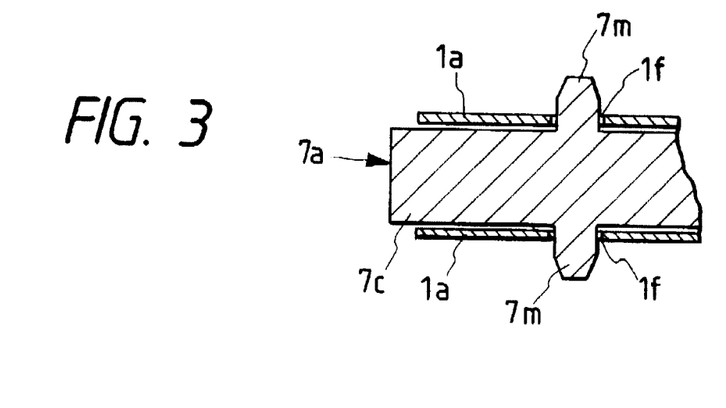
FIG. 3 is a partially enlarged section view of the sensing element lead wire connecting structure shown in FIG. 1.

Further, according to the sensing element 7 of the first embodiment, as shown in FIGS. 2 and 3, in one fixing portion 7c of the plate-shaped member 7a, in particular, on the front and back surfaces of the present fixing portion 7c mutually opposed to each other in the thickness direction of the plate-shaped member 7a, there are respectively provided engaging pins 7m which are not provided in the sensing element 7 of FIG. 10. On the other hand, the securing hole 7k formed in the sensing element 7 of FIG. 10 is omitted in the present embodiment. As shown in FIG. 1, according to the present embodiment, in the portion of the plate-shaped member 7a that ranges from the fixing portion 7c having the engaging pins 7m provided thereon to the coil portion 7b, two flexible substrates 1, which are used to connect the magnet wires 7h with the lead wires 73a, 73b, 75a and 75b for external connection shown in FIG. 11, are respectively attached to the two front and back surfaces of the plate-shaped member 7a.

Figure 4:
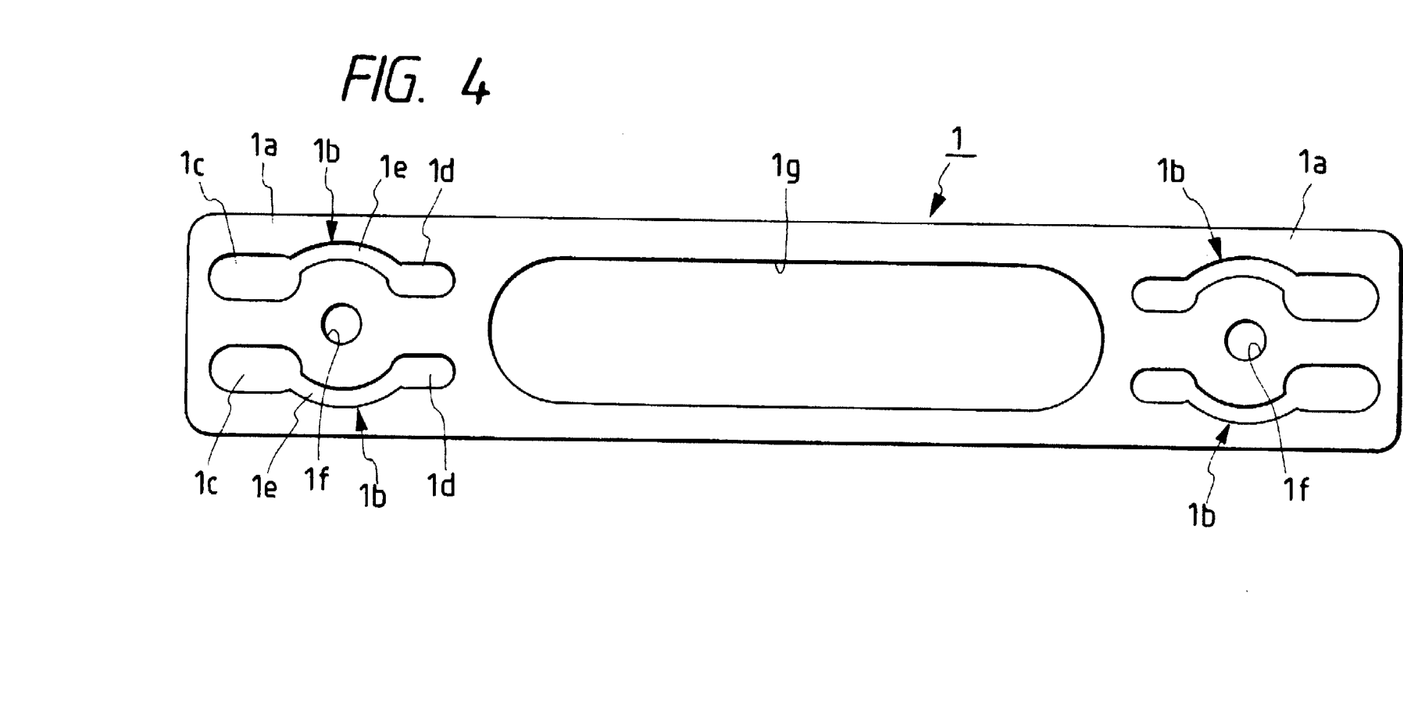
FIG. 4 is a plan view of a flexible circuit board shown in FIG. 1, illustrating the developed state thereof.

The above-mentioned flexible substrate 1 (which corresponds to a printed circuit board) shows a substantially rectangular shape when it is viewed from above the top side thereof, that is, as a top plan view thereof. The dimension of the flexible circuit board 1 in the width direction extending at right angles to the longitudinal direction thereof is set slightly smaller than the dimension of the plate-shaped member 7a of the sensing element 7 in the width direction thereof.

And, the flexible circuit board 1 includes two terminal portions 1a, which are respectively formed on the surface portion of the flexible circuit board 1 and are disposed near to the two ends of the flexible circuit board 1 in the longitudinal direction thereof, and an elongated hole 1g which is formed in the portion of the flexible circuit board 1 extending between these two terminal portions 1a and 1a and also extends along the longitudinal direction of the flexible circuit board 1.

Each of the two terminal portions 1a (the two flexible circuit board portions which are mutually opposed to each other with the folded position thereof between them) includes two conductive patterns 1b, 1b and an engaging hole 1f.

The above-mentioned conductive patterns 1b each includes a large land 1c (which corresponds to a second land) which is used to solder the lead wires 73a, 73b, 75a and 75b, a small land 1d (which corresponds to a first land) which is used to solder the magnet wires 7h, a connecting portion 1e which is used to connect these large and small lands 1c and 1d to each other electrically.

Referring to the large land 1c, two large lands 1c are respectively formed in the surface portion of the flexible circuit board 1 situated near to the end portion thereof in the longitudinal direction thereof in such a manner that they are spaced from each other in the width direction of the flexible circuit board 1. As for the small land 1d, two small lands 1d are respectively formed in the surface portions of the flexible circuit board 1 which are situated near to the elongated hole 1g and spaced from their associated large lands 1c in the longitudinal direction of the flexible circuit board 1. Also, the connecting portions 1e are respectively formed in substantially arc-like shapes which are spaced further apart from each other in the width direction of the flexible circuit board where they part further apart from their associated large and small lands 1c and 1d.

The engaging hole 1f is formed in the surface portion of the flexible circuit board 1 that provides substantially the center of curvature of the two connecting portions 1e in the terminal portion 1a, while all the portions of the terminal portion 1a except for the portion of the conductive pattern 1b are coated with an insulation film.

The elongated hole 1g is formed such that the dimension thereof in the longitudinal direction of the flexible circuit board 1 is almost double the dimension of the coil portion 7b in the longitudinal direction of the plate-shaped member 7a of the sensing element 7.

Now, referring to the structure of the flexible circuit board 1, as shown in FIG. 1, in a state that the plate-shaped member 7a of the sensing element 7 is inserted into the elongated hole 1g and the portions of the flexible circuit board 1 existing on the two sides of the elongated hole 1g in the width direction thereof are caught by the notch portions 7e existing on the two sides of the plate-shaped member 7a in the width direction thereof and separating the coil portion 7b of the plate-shaped member 7a from the fixing portion 7c not having the engaging pins 7m thereon, if the flexible circuit board 1 is folded up substantially in the longitudinal direction middle portion thereof in such a manner that the back surface thereof faces the plate-shaped member 7a, then the coil 7g can be exposed externally from the elongated hole 1g on the front and back surfaces of the plate-shaped member 7a, and, on the front and back surfaces of the plate-shaped member 7a, the respective terminal portions 1a of the flexible circuit board 1 can be attached to the most part of the fixing portion 7c having the engaging pins 7m thereon, and the engaging holes 1f of the respective terminal portions 1a can be situated at the portions of the sensing element 7 corresponding to the respective engaging pins 7m.

Next, description will be given below of the operation of the sensing element lead wire connecting structure according to the present embodiment.

To electrically connect the respective magnet wires 7h with their corresponding lead wires 73a, 73b, 75a and 75b by soldering, at first, as shown in FIG. 1, the plate-shaped member 7a is inserted into the elongated hole 1g and the two side portions of the plate-shaped member 7a respectively corresponding to the flexible circuit board 1 are caught on their corresponding notch portions 7e.

And, the flexible circuit board 1 is folded substantially in the longitudinal direction middle portion thereof with the back surface thereof facing the plate-shaped member 7a. In this state, the two engaging pins 7m, as shown in FIG. 3, are respectively inserted into and engaged with the engaging holes 1f of the flexible circuit board 1 which are situated at the corresponding positions of the terminal portions 1a.

Therefore, the flexible circuit board 1 is substantially fixed in a -state that the terminal portions 1a thereof are mounted on the front and back surfaces of the fixing portion 7c of the plate-shaped member 7a respectively.

After then, one end portion of one magnet wire 7h wound around the two through holes 7f and 7f of the plate-shaped member 7a disposed opposed to each other in the longitudinal direction of the member 7a and one end portion of the other magnet wire wound around the other two through holes 7f and 7f of the plate-shaped member 7a disposed opposed to each other in the width direction of the member 7a, with the insulation films thereof peeled off, are respectively soldered to the small lands 1d and 1d of the conductive patterns 1b and 1b of one terminal portion 1a of the flexible circuit board 1 situated on the front surface side of the fixing portion 7c of the plate-shaped member 7awhile the end portions of the corresponding lead wires 73aand 73b, with the covers thereof peeled off, are respectively soldered to the large lands 1c and 1c of the above conductive patterns 1b and 1b.

Also, similarly, the other end portions of the above two magnet wires 7h, with the insulation film thereof peeled off, are respectively soldered to the small lands 1d and 1d of the conductive patterns 1b and 1b of the other terminal portion 1a of the flexible circuit board 1 situated on the back surface side of the fixing portion 7c of the plate-shaped member 7awhile the end portions of the corresponding lead wires 75a and 75b with the covers thereof peeled off are respectively soldered to the large lands 1c and 1c of the above conductive patterns 1b and 1b.

Accordingly, the four end portions of the two magnet wires 7h are electrically connected with the corresponding lead wires 73a, 73b, 75a and 75b through the conductive patterns 1b and 1b.

As can be seen from the foregoing description, according to the sensing element lead wire connecting structure of the first embodiment, the two end portions 1a and 1a located near to the two end portions of the flexible circuit board 1 folded substantially in the longitudinal direction middle portion thereof with the back surface thereof facing the plate-shaped member 7a are respectively mounted on the front and back surfaces of one fixing portion 7c of the plate-shaped member 7a of the sensing element 7, and the two engaging pins 7m and 7m respectively projected from the front and back surfaces of the fixing portion 7c are respectively engaged with the engaging holes 1fformed in the respective terminal portions 1a and 1a to thereby fix the terminal portions 1a and 1a to the fixing portion 7c in such a manner that they are respectively mounted on the front and back surfaces of the fixing portion 7c; and, in this state, the four end portions of the two magnet wires 7h and the end portions of the corresponding lead wires 73a, 73b, 75a and 75b are respectively soldered to the two conductive patterns 1b and 1b respectively provided in the front surface side portions of the terminal portions 1a and 1a, so that the four end portions of the two magnet wires 7h can be connected with their corresponding lead wires 73a, 73b, 75a and 75b electrically.

With use of the above structure, by a simple operation to bring the engaging pins 7m and 7m provided on the front and back surfaces of the fixing portion 7c into engagement with the engaging holes 1f of the respective terminal portions 1a and 1athe positions of the two conductive patterns 1b and 1b of the terminal portions 1a and 1a can be fixed to the sensing element 7, and the four end portions of the two magnet wires 7h as well as their corresponding lead wires 73a, 73b, 75a and 75b can be stably soldered to the two conductive patterns 1b and 1b that are fixed in position to the sensing element 7.

Therefore, it is possible to prevent the occurrence of poor electric connection between the magnet wires 7h and the lead wires 73a, 73b, 75a and 75b and the occurrence of breakage or the like of the magnet wires 7h during the soldering operation.

Also, according to the sensing element lead wire connecting structure of the first embodiment, since the two terminal portions 1a and 1a of the flexible circuit board 1 are respectively mounted on the front and back surfaces of the fixing portion 7c of the plate-shaped member 7a of the sensing element 7, the four electric connecting portions between the four end portions of the two magnet wires 7h and their corresponding lead wires 73a, 73b, 75a and 75b can be divided to two sections, that is, the terminal portion 1a on the front surface of the fixing portion 7c and the terminal portion 1a on the back surface thereof, so that the four end portions of the two magnet wires 7h can be correctly soldered and electrically connected to their corresponding lead wires 73a, 73b, 75a and 75b without confusing the four end portions with each other.

Further, according to the sensing element lead wire connecting structure of the first embodiment, the lead wires 73a, 73b, 75a and 75b are soldered to their corresponding four end portions of the magnet wires 7h in such a manner that the soldering portions thereof are divided to the large and small lands 1c and 1d which are situated at mutually different positions on the same conductive pattern 1b. Due to this, when compared with a case in which the four end portions of the two magnet wires 7h are soldered to the end portions of the corresponding lead wires 73a, 73b, 75a and 75b in the same portion on the conductive pattern 1b, it is possible to eliminate a complicated, time-and-labor consuming operation that the end portions of the magnet wires 7h as well as the end portions of the lead wires 73a, 73b, 75a and 75b are superimposingly held and are then positioned on the conductive pattern 1b.

Still further, the above operation that the end portions of the magnet wires 7h as well as the end portions of the lead wires 73a, 73b, 75a and 75b are superimposingly held and are then positioned on the conductive pattern 1b also provides an unstable soldering operation. However, with use of the connecting structure according to the present embodiment, such unstable soldering operation can be omitted, which makes it possible to improve further the stability of a soldering operation to solder the magnet wires 7h to the lead wires 73a, 73b, 75a and 75b on the conductive pattern 1b.

Second Embodiment

Figure 5:
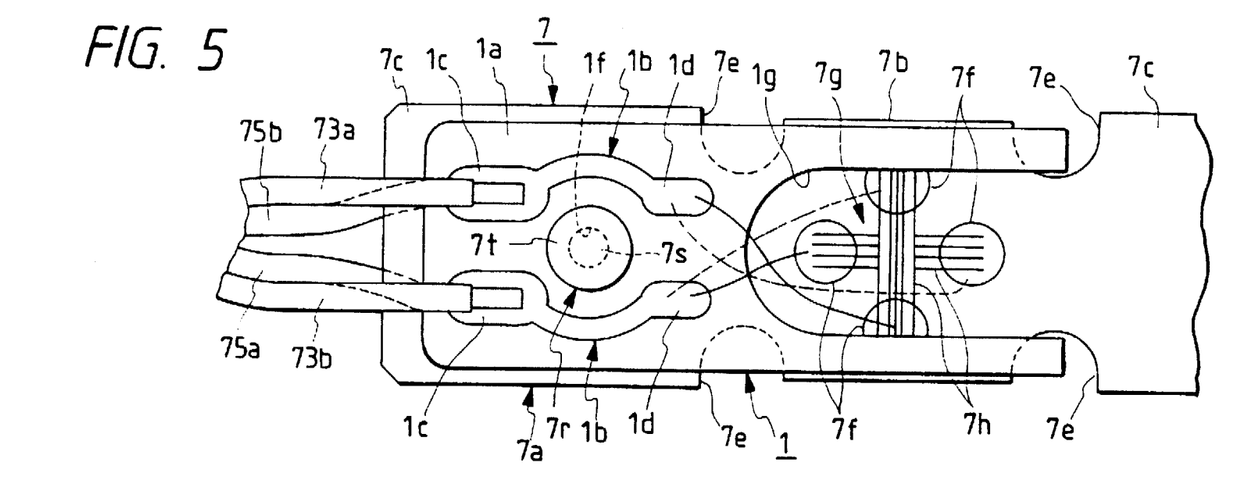
FIG. 5 is an enlarged front view of the main portions of a second embodiment of a sensing element lead wire connecting structure according to the invention.
Figure 6:
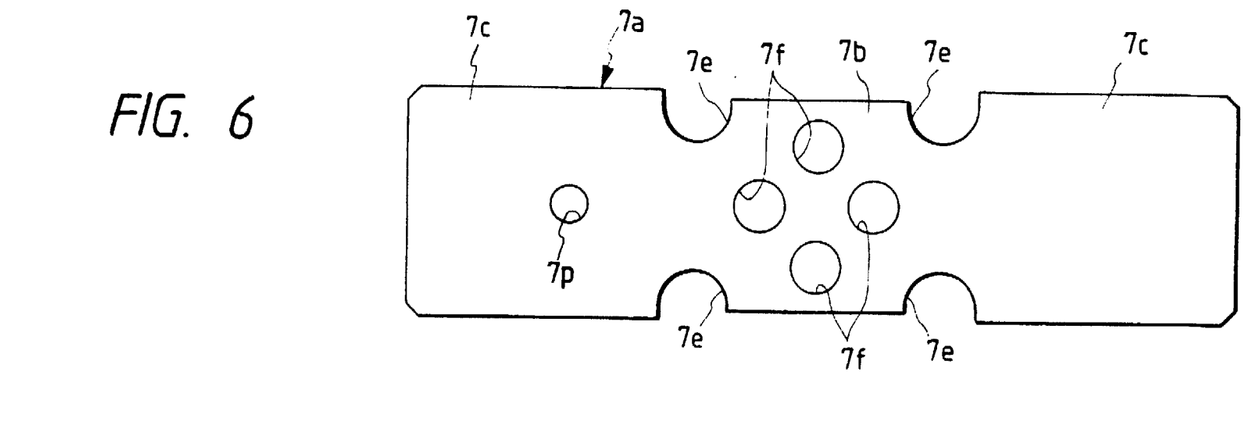
FIG. 6 is an enlarged plan view of a plate-shaped member of a sensing element shown in FIG. 5.
Figure 7:
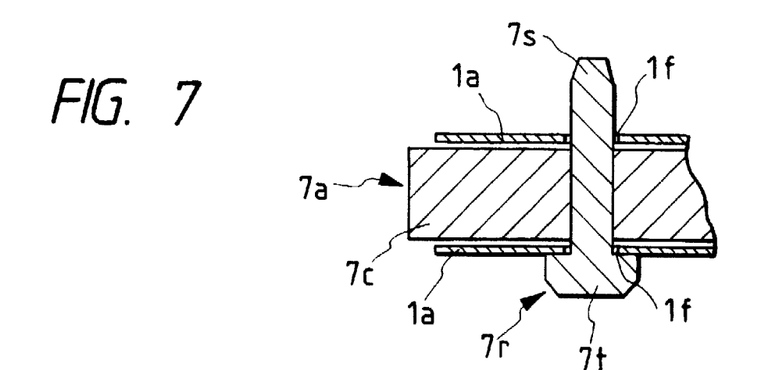
FIG. 7 is a partially enlarged section view of the sensing element lead wire connecting structure shown in FIG. 5.

Next, description will be given below of a second embodiment of a sensing element lead wire connecting structure according to the invention with reference to FIGS. 5 to 7. In FIGS. 5 to 7, the same parts and portions thereof as those in FIGS. 1 to 3 will be described while they are given the same designations in FIGS. 1 to 3.

The sensing element lead wire connecting structure according to the second embodiment is different from the sensing element lead wire connecting structure according to the previously described first embodiment in the following two respects. That is, firstly, there are omitted the engaging pins 7m which are provided on and projected from the front and back surfaces of one fixing portion 7c of the plate-shaped member 7a of the sensing element 7 and, instead of them, there is formed a pin insertion hole 7p which has an inside diameter substantially identical with the engaging hole 1f of the flexible circuit board 1 and extends through the front and back surfaces of one fixing portion 7c on which the engaging pins 7m were provided. Secondly, the two terminal portions 1a and 1a of the flexible substrate 1 are respectively fixed to the front and back surfaces of the fixing portion 7c of the plate-shaped member 7a by a through pin 7r which is inserted through the pin insertion hole 7p. The other remaining portions of the second embodiment are similar to the sensing element lead wire connecting structure according to the first embodiment.

The above-mentioned through pin 7r includes a pin main body 7s and a head portion 7t which is connected continuously with one end of the pin main body 7s.

The pin main body 7s has an outside diameter which, when the pin main body 7s is inserted through the pin insertion hole 7p, allows the outer peripheral surface of the pin main body 7s to be slidingly contacted with and be press inserted through the inner peripheral surface of the pin insertion hole 7p with a given friction force. And, the pin main body 7s is further so formed as to have a length which is sufficiently greater than the thickness of the plate-shaped member 7a of the sensing element 7. On the other hand, the head portion 7t is formed such that it has an outside diameter sufficiently greater than not only the pin insertion hole 7p but also the engaging hole 1f of the flexible circuit board 1.

The thus formed through pin 7r is structured in the following manner. That is, in a state where the terminal portions 1a and 1a situated near to the two ends of the flexible circuit board 1 folded up substantially in the longitudinal direction middle portion thereof are respectively mounted on the front and back surfaces of one fixing portion 7c of the plate-shaped member 7a of the sensing element 7, if the pin main body 7s of the through pin 7r is inserted from the leading end side thereof into the pin insertion hole 7p of the fixing portion 7c through the engaging hole 1f of the terminal portion 1a from one of the front and back surface sides of the fixing portion 7c and the end face of the head portion 7t on the pin main body 7s side thereof is thereby applied to the plate-shaped member 7a, then the pin main body 7s is projected out from the other surface side of the fixing portion 7c and is then inserted through the engaging hole 1f of the terminal portion 1a. Accordingly, unless the through pin 7r is removed to such an extent that the head portion 7t thereof can be separated apart from the plate-shaped member 7a, the engaging hole 1f of the terminal portion 1a of the fixing portion 7c on the other surface side thereof is caught by the leading end portion of the pin main body 7s projected out from the other surface of the fixing portion 7c, which makes it impossible to remove the engaged condition of the terminal portion 1a with respect to the other surface of the fixing portion 7c.

With use of the thus structured sensing element lead wire connecting structure of the second embodiment as well, similarly to the sensing element lead wire connecting structure of the first embodiment, by a simple operation to insert the pin main body 7s of the through pin 7r from one of the front and back surface sides of the fixing portion 7c to the other surface side of the fixing portion 7c through the engaging holes 1f of the terminal portions 1a and 1a of the flexible circuit board 1 respectively engaged with the front and back surfaces of the fixing portion 7c, the positions of the two conductive patterns 1b and 1b of the terminal portions 1a and 1a can be fixed to the sensing element 7 and the magnet wires 7h can be electrically connected to the lead wires 73a, 73b, 75a and 75b with no confusion in correspondence and in a more stabilized condition than a structure in which they are soldered in the same portion on the conductive pattern 1b, thereby being able to prevent the possible breakage of the magnet wires 7h and the possible poor electrical connection between the magnet wires and lead wires.

Also, according to the sensing element lead wire connecting structure of the second embodiment, if the terminal portions 1a and 1a are respectively fixed to the front and back surfaces of the fixing portion 7c of the plate-shaped member 7a by the through pin 7r and the head portion 7t of the through pin 7r is applied to the plate-shaped member 7a, then the engaging hole 1f is caught by the leading end portion of the pin main body 7s to thereby make it impossible to remove the engaged condition of the terminal portion 1a with respect to the fixing portion 7c, unless the through pin 7r is pulled out to some extent. Thanks to this, simply by applying the head portion 7t of the through pin 7r onto the plate-shaped member 7a, the terminal portions 1a and 1a can be positively fixed to the front and back surfaces of the fixing portion 7c, respectively.

Here, the fixation of the two terminal portions 1a and 1a of the flexible circuit board 1 to the front and back surfaces of the fixing portion 7c of the plate-shaped member 7a of the sensing element 7 can also be achieved by separate members which can be respectively used for the front and back surfaces of the fixing portion 7c. For example, for this purpose, there can be used a fixing pin which is inserted through the terminal portion 1a and is fixed to the front surface of the fixing portion 7c, and a fixing pin which is inserted through the terminal portion 1a and is fixed to the back surface of the fixing portion 7c.

Also, when using separate fixing members respectively for fixing the front and back surfaces of the fixing portion 7c, for example, firstly, the terminal portion 1a may be fixed to one of the front and back surfaces of the fixing portion 7c by the engagement of the engaging hole 1f of the terminal portion 1a with the engaging pin projected from the present surface as in the first embodiment, and, after then, the terminal portion 1a may be fixed to the other surface by a fixing pin which can be inserted through the terminal portion 1a and can be then fixed to the fixing portion 7c.

With use of this structure, there can be eliminated the operation, which is employed in the sensing element lead wire connecting structure according to the second embodiment, to position the pin insertion hole 7p of the plate-shaped member 7a with respect to the engaging hole 1f of the terminal portion 1a on both front and back surfaces of the fixing portion 7c. Further, differently from the sensing element lead wire connecting structure according to the first embodiment, when the engaging pins 7m and 7m provided on the front and back surfaces of the plate-shaped member 7a are engaged with the engaging holes 1f and 1f of the two terminal portions 1a and 1a the two terminal portions 1a and 1a can be respectively fixed to the front and back surfaces of the fixing portion 7c, without carrying out the operation to extend the flexible substrate 1.

On the other hand, as in the sensing element lead wire connecting structure according to the second embodiment, if there is employed a structure that the two terminal portions 1a and 1a are respectively fixed to the front and back surfaces of the fixing portion 7c by use of a single through pin 7r, then the number of parts for fixation can be reduced, which in turn can reduce the costs of parts as well as the operation costs.

Further, it is also possible to employ a structure in which the respective back surfaces of the two terminal portions 1a and 1a of the flexible substrate 1 are fixed to the front and back surfaces of the fixing portion 7c by a double sided adhesive tape or an adhesive material such as an adhesive agent or the like.

The two terminal portions 1a and 1a which are respectively attached to the front and back surfaces of the fixing portion 7c of the plate-shaped member 7a of the sensing element 7, may also be formed of separate members. However, as in the sensing element lead wire connecting structures according to the first and second embodiments of the invention, if the two terminal portions 1a and 1a to be respectively attached to the front and back surfaces of the fixing portion 7c of the plate-shaped member 7a of the sensing element 7 are formed of a single flexible circuit board 1, then the number of parts for wiring can be reduced and thus the number of parts and operation costs can also be reduced.

Or, the terminal portions 1a may be formed of a hard printed circuit board or the like whether they are respectively attached to the front and back surfaces of the fixing portion 7c of the plate-shaped member 7a of the sensing element 7.

And, the conductive patterns used to electrically connect the magnet wires 7h with the lead wires 73a, 73b, 75a and 75b, as in the sensing element lead wire connecting structures according to the first and second embodiments, may be structured such that the soldering portions of the lead wires 73a, 73b, 75a and 75b and the soldering portions of the magnet wires 7h are not separated from each other like the large and small lands 1c and 1d. Also, when the soldering portions are divided to the large and small lands 1c and 1d, they are not electrically connected with each other by the connecting portion 1e like the sensing element lead wire connecting structures according to the first and second embodiments, but a part of the large land 1c and a part of the small land 1d may be structured such that they are continuous in structure with each other and thus they are electrically connected with each other.

Further, in the above-mentioned first and second embodiments, description has been given by taking the case of the sensing element 7 which is disposed within the shackle pin 5 of a vehicle such as a truck or the like for measuring the load of the vehicle. However, the invention is not limited to this but, of course, the invention can be widely applied to a load measuring sensing element which, in accordance with a load to be applied to a magnetic member, outputs electric variations in a coil composed of conductors wound around the magnetic member, as a structure for connection of lead wires for external connection.

As has been described heretofore, according to the invention, for use in a sensing element comprising a base member formed of magnetic material and conductors forming a coil wound around the base member for externally outputting electric variations occurring on the coil in accordance with a load applied onto the base member, there is provided a sensing element lead wire connecting structure for connecting lead wires for external connection to the conductors, comprising: a printed circuit board to be mounted on the base member; a conductive pattern formed in the portion of the printed circuit board that is exposed externally while the printed circuit board is mounted on the base member; and, a fixing member for fixing the printed circuit board to the base member in such a manner that it is mounted on said base member, in which electrical connection between the conductors and the lead wires corresponding to the conductors is made on the conductive pattern.

That is, the electrical connection between the conductors forming the coil of the sensing element and the lead wires for external connection is made on the conductive pattern of the printed circuit board which is mounted on the base member and is then fixed to the base member by the fixing member. Due to this, the operation to electrically connect the conductors and lead wires to the conductive pattern by soldering or the like can be executed on the printed circuit board that is fixed to the base member. Accordingly, the operation to connect the conductors forming the coil of the sensing element for load measurement with the lead wires for external connection can be performed in a stable manner, and further, it is possible to surely prevent the occurrences of poor soldering, breakage of the conductors during the connecting operation, and other inconveniences.

Also, according to the sensing element lead wire connecting structure of the invention, the fixing member includes the engaging hole formed in the printed circuit board, and the fixing pin which, with the printed circuit board mounted on the base member, can be inserted through the engaging hole and fixed to the portion of the base member corresponding to the engaging hole.

Further, according to the sensing element lead wire connecting structure of the invention, the fixing member includes the engaging hole formed in the printed circuit board, and the fixing pin which is provided on and projected from the portion of the base member corresponding to the engaging hole. In this structure, with the printed circuit board mounted on the base member, if the engaging hole is engaged with the engaging pin, then the printed circuit board can be fixed to the base member.

Still further, according to the sensing element lead wire connecting structure of the invention, the conductive pattern is formed in one surface of the printed circuit board, and the fixing member includes an adhesive material which can be used to glue the other surface of the printed circuit board opposed to the above-mentioned one surface thereof to the base member.

Therefore, according to the present invention, the fixation of the printed circuit board to the base member can be achieved by a simple operation: that is, in the sensing element lead wire connecting structure of the invention, by fixing the fixing pin to the base member through the engaging hole formed in the printed circuit board; in the sensing element lead wire connecting structure of the invention, by engaging the engaging pin of the base member into the engaging hole of the printed circuit board; and, in the sensing element lead wire connecting structure of the invention, by gluing the other surface of the printed circuit board opposed to one surface thereof with the conductive pattern formed therein to the base member by use of the adhesive material.

Also, according to the sensing element lead wire connecting structure of the invention, the coil is composed of the two conductors that are wound around the base member in a mutually intersecting manner, the lead wires are respectively connected to the two conductors, the two portions of the printed circuit boards are respectively mounted on the mutually opposed front and back surfaces of the base member, the two fixing members are correspondingly provided in the printed circuit board portion to be mounted on the front surface of the base member and in the printed circuit board portion to be mounted on the back surface of the base member, the conductive pattern is composed of the two conductive patterns that are respectively disposed on the printed circuit board portion to be mounted on the front surface of the base member and on the printed circuit board to be mounted on the back surface of the base member, and the electrical connection between one of the two conductors and the lead wire corresponding to the present conductor is made on the conductive pattern of the printed circuit board to be mounted on the front surface of the base member, while the electrical connection between the other conductor and the lead wire corresponding to the present conductor is made on the conductive pattern of the printed circuit board to be mounted on the back surface of the base member.

That is, according to the present connecting structure, the electrical connection between the two conductors forming the coil of the sensing element and the lead wires corresponding to the respective conductors is achieved by the respective conductive patterns of the individual printed circuit boards to be mounted on the front and back surfaces of the base member. Due to this, the respective conductors can be separately guided to the front and back surfaces of the base member without confusing them with each other and can be thereby electrically connected to their corresponding lead wires with no mistake.

And, according to the sensing element lead wire connecting structure of the invention, since the fixing member corresponding to the printed circuit board to be mounted on the front surface of the base member is formed of a member common to the fixing member corresponding to the printed circuit board to be mounted on the back surface of the base member, the fixing means can be produced as a common member, which in turn makes it possible to reduce the number of parts necessary for the fixing member and the number of steps necessary for an operation to fix the respective printed circuit boards to their corresponding front and back surfaces of the base member by means of the fixing member.

Also, according to the sensing element lead wire connecting structure of the invention, the printed circuit board to be mounted on the front surface of the base member and the printed circuit board to be mounted on the back surface of the base member are formed of a single flexible circuit board, and, when the flexible circuit board is folded up into two portions which are opposed to each other with the folded position of the flexible circuit board between them, one of the two folded flexible circuit board portions is mounted on the front surface of the base member, while the other flexible circuit board portion is mounted on the back surface of the base member. Due to this, the printed circuit boards respectively to be mounted on the front and back surfaces of the base member can be produced as a single part, which results in the reduced number of parts.

Further, according to the sensing element lead wire connecting structure of the invention, the fixing member includes a through pin which, with the two flexible circuit board portions respectively mounted on the front and back surfaces of the base member, can be inserted from outside into one of the two flexible circuit board portions, is allowed to extend through the base member and the other of the two flexible circuit board portions, and can be projected out in the leading end portion thereof externally of the other flexible circuit board portion, the through pin includes in the base end portion thereof a head portion which can be engaged with one flexible circuit board portion from outside, and the portion of the through pin that extends through and is projected out externally from the other flexible circuit board portion is formed to have such a dimension that, with the head portion engaged with said one flexible circuit board portion, prevents the other flexible circuit board portion from being taken out from the leading end portion of the through pin.

Thanks to this, when there is employed a structure that the individual printed circuit boards respectively to be mounted on the front and back surfaces of the base member are formed of a single flexible circuit board and, with the flexible circuit board folded up to two portions, the two flexible circuit board portions opposed to each other with the folded position between them are respectively mounted onto the corresponding front and back surfaces of the base member, the flexible circuit board mounted on the front and back surfaces of the base member can be positively fixed to the base member by a simple operation, that is, simply by inserting the through pin into one flexible circuit board portion from outside and allowing it to extend through the base member and the other flexible circuit board portion, using only a single part, that is, the through pin.

Still further, according to the sensing element lead wire connecting structure of the invention, the conductive pattern includes a first land to which the conductors can be electrically connected, and a second land which is electrically connected to the first land and to which the lead wires can be electrically connected.

That is, the electrically connected portions of the conductors and lead wires to the conductive pattern are divided to the first land on the conductive pattern and the second land connected electrically to the first land. Due to this arrangement, if the electrically connected portions of the conductors and lead wires with respect to the conductive patterns are produced by soldering or the like, it is possible to eliminate the time-and-labor consuming operation to hold the electrically connecting portions of both the conductors and lead wires in an superimposing manner, and further, it is possible to enhance further the stability of a connecting operation to connect the conductors to the lead wires for external connection, when compared with a case where the conductors and lead wires are electrically connected to the same portion on the conductive pattern.

What is claimed is:

1. A load sensing element structure connecting conductors with lead wires for external connection, comprising:

a base member formed of magnetic material receiving an applied load;

a coil portion formed by winding the conductors around the base member for externally outputting electric variations occurring on the coil portion in accordance with the load applied onto the base member;

a printed circuit board mounted on the base member;

a conductive pattern formed in the portion of the printed circuit board that is exposed externally while the printed circuit board is mounted on the base member; and a fixing member for fixing the printed circuit board to the base member, wherein electrical connection between the conductors and the lead wires is made on the conductive pattern.

2. The sensing element structure of claim 1, wherein the conductive pattern includes a first land to which the conductors can be electrically connected, and a second land which is electrically connected to the first land and to which the lead wires are electrically connected.

3. A sensing element structure connecting conductors with lead wires for external connection, comprising:

a base member formed of magnetic material;

a coil portion formed by winding the conductors around the base member to externally output electric variations occurring on the coil portion in accordance with a load applied onto the base member;

a printed circuit board mounted on the base member;

a conductive pattern formed in the portion of the printed circuit board that is exposed externally while the printed circuit board is mounted on the base member; and a fixing member for fixing the printed circuit board to the base member, wherein electrical connection between the conductors and the lead wires is made on the conductive pattern, wherein the fixing member includes an engaging hole formed in the printed circuit board and a fixing pin which, with the printed circuit board mounted on the base member, can be inserted into the engaging hole and can be fixed to a portion of the base member that corresponds to the engaging hole.

4. A sensing element structure connecting conductors with lead wires for external connection, comprising:

a base member formed of magnetic material;

a coil portion formed by winding the conductors around the base member to externally output electric variations occurring on the coil portion in accordance with a load applied onto the base member;

a printed circuit board mounted on the base member;

a conductive pattern formed in the portion of the printed circuit board that is exposed externally while the printed circuit board is mounted on the base member; and a fixing member for fixing the printed circuit board to the base member, wherein electrical connection between the conductors and the lead wires is made on the conductive pattern, wherein the fixing member includes an engaging hole formed in the printed circuit board and an engaging pin projected from a portion of the base member corresponding to the engaging hole, and wherein, with the printed circuit board mounted on the base member, when the engaging hole engages with the engaging pin, the printed circuit board can be fixed to the base member.

5. A sensing element structure connecting conductors with lead wires for external connection, comprising:

a base member formed of magnetic material;

a coil portion formed by winding the conductors around the base member to externally output electric variations occurring on the coil portion in accordance with a load applied onto the base member;

a printed circuit board mounted on the base member;

a conductive pattern formed in the portion of the printed circuit board that is exposed externally while the printed circuit board is mounted on the base member; and a fixing member for fixing the printed circuit board to the base member, wherein electrical connection between the conductors and the lead wires is made on the conductive pattern, wherein the conductive pattern is formed in one surface of the printed circuit board, the fixing member includes an adhesive material for gluing the other surface of the printed circuit board opposed to the one surface of the printed circuit board to the base member.

6. A sensing element structure connecting conductors with lead wires for external connection, comprising:

a base member formed of magnetic material;

a coil portion formed by winding the conductors around the base member to externally output electric variations occurring on the coil Portion in accordance with a load applied onto the base member;

a printed circuit board mounted on the base member;

a conductive pattern formed in the portion of the printed circuit board that is exposed externally while the printed circuit board is mounted on the base member; and a fixing member for fixing the Printed circuit board to the base member, wherein electrical connection between the conductors and the lead wires is made on the conductive pattern, wherein the coil portion has coils which are formed of two of the conductors wound around the base member in such a manner that the conductors intersect each other, the lead wires are respectively connected to the two conductors, two end portions of the printed circuit board are respectively mounted on the mutually opposed front and back surfaces of the base member, the fixing member has two fixing parts which are respectively provided in the printed circuit board to be mounted on the front surface of the base member and in the printed circuit board to be mounted on the back surface of the base member, the conductive pattern has two conductive patterns which are respectively formed in the printed circuit board to be mounted on the front surface of the base member and in the printed circuit board to be mounted on the back surface of the base member, one of the two conductors is electrically connected to the corresponding one of the lead wires on the conductive pattern of the printed circuit board to be mounted on the front surface of the base member, and the other of the two conductors is electrically connected to the corresponding one of the lead wires on the conductive pattern of the printed circuit board to be mounted on the back surface of the base member.

7. The sensing element structure of claim 6, wherein the fixing member corresponding to the printed circuit board to be mounted on the front surface of the base member is formed of a member common to the fixing member corresponding to the printed circuit board to be mounted on the back surface of the base member.

8. The sensing element structure claim 6, wherein the printed circuit board to be mounted on the front surface of the base member and the printed circuit board to be mounted on the back surface of the base member are formed of a single flexible circuit board, wherein when the flexible circuit board is folded up into two portions which are opposed to each other with the folded position of the flexible circuit board between them, one of the two portions of the flexible circuit board is mounted on the front surface of the base member, and the other portion of the flexible circuit board is mounted on the back surface of the base member.

9. The sensing element structure of claim 8, wherein the fixing member includes a through pin which, with the two portions of the flexible circuit board respectively mounted on the front and back surfaces of the base member, can be inserted from outside into one of the two portions of the flexible circuit board, is allowed to extend through the base member and the other of the two portions of the flexible circuit board, and can be projected out in the leading end portion thereof externally of the other portion of the flexible circuit board, the through pin includes in the base end portion thereof a head portion which can be engaged with the one portion of the flexible circuit board from outside, and the portion of the through pin that extends through and is projected out externally from the other portion of the flexible circuit board is formed to have such a dimension that, with the head portion engaged with the one portion of the flexible circuit board, prevents the other portion of the flexible circuit board from being taken out from the leading end portion of the through pin.

* * * * *